(12) United States Patent
Sato et al.

(10) Patent No.: US 9,165,595 B2
(45) Date of Patent: Oct. 20, 2015

(54) INFORMATION RECORDING DEVICE, INFORMATION RECORDING MEDIUM AND INFORMATION RECORDING METHOD

(71) Applicant: Sharp Kabushiki Kaisha, Osaka-shi, Osaka (JP)

(72) Inventors: Takanobu Sato, Osaka (JP); Takashi Arimoto, Osaka (JP); Yoshihisa Adachi, Osaka (JP); Hirohisa Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/389,388

(22) PCT Filed: Mar. 27, 2013

(86) PCT No.: PCT/JP2013/058939
§ 371 (c)(1),
(2) Date: Sep. 30, 2014

(87) PCT Pub. No.: WO2013/157361
PCT Pub. Date: Oct. 24, 2013

(65) Prior Publication Data
US 2015/0049597 A1    Feb. 19, 2015

(30) Foreign Application Priority Data
Apr. 16, 2012 (JP) .................................. 2012-093268

(51) Int. Cl.
*G11B 20/00* (2006.01)
*G11B 19/12* (2006.01)
*G11B 23/28* (2006.01)
*G11B 20/10* (2006.01)

(52) U.S. Cl.
CPC ........ *G11B 20/00594* (2013.01); *G11B 19/122* (2013.01); *G11B 20/00086* (2013.01); *G11B 20/00094* (2013.01); *G11B 20/00137* (2013.01); *G11B 20/00166* (2013.01); *G11B 20/00173* (2013.01); *G11B 20/00181* (2013.01); *G11B 20/00188* (2013.01); *G11B 20/00688* (2013.01); *G11B 20/00731* (2013.01); *G11B 23/284* (2013.01); *G11B 2020/10833* (2013.01); *G11B 2220/211* (2013.01); *G11B 2220/235* (2013.01); *G11B 2220/2537* (2013.01)

(58) Field of Classification Search
None
See application file for complete search history.

(56) References Cited

U.S. PATENT DOCUMENTS

2005/0102252 A1    5/2005    Noguchi

FOREIGN PATENT DOCUMENTS

| JP | 2004-118564 A | 4/2004 |
|---|---|---|
| JP | 2005-302112 A | 10/2005 |

OTHER PUBLICATIONS

Machine translation of JP2005-302112A into English; Kitajima.*

(Continued)

*Primary Examiner* — Wayne Young
*Assistant Examiner* — Brian Butcher
(74) *Attorney, Agent, or Firm* — Keating & Bennett, LLP

(57) ABSTRACT

User convenience of data whose duplication is restricted and data created by utilizing the data is improved. An information recording device (10) is capable of recoding information onto an RE layer (22) of an optical disk (1), and includes a recording and replay control section (54) for recording, onto the RE layer (32), duplication-restricted information utilization information (32) created by utilizing duplication-restricted information (31) whose duplication onto a different optical disk is restricted.

11 Claims, 6 Drawing Sheets

(56) References Cited

OTHER PUBLICATIONS

Official Communication issued in International Patent Application No. PCT/JP2013/058939, mailed on Apr. 23, 2013.

Pamphlet on "Dejitaru Kyokasho" (Digital Textbook), Tokyo Shoseki Co., Ltd., Apr. 2014, 11 pages.

"Mai Kyokasho Edita" (My Textbook Editor), Tokyo Shuppan Co., Ltd., Internet <http://ten.tokyo-shoseki.co.jp/text/shou_current/digital/index.html>, Mar. 9, 2012, 2 pages.

* cited by examiner (a)

(b)

(a)

(b)

INFORMATION RECORDING DEVICE, INFORMATION RECORDING MEDIUM AND INFORMATION RECORDING METHOD

TECHNICAL FIELD

The present invention relates to an information recording device etc. that are used in the utilization of duplication-restricted information whose duplication is restricted.

BACKGROUND ART

In recent years, the popularization of electronic books has made it possible to view a larger number of electronic books on electronic devices such as PCs (personal computers), PDAs (personal digital assistants), and large-sized displays. Along with the popularization of electronic books, services that sell user-editable electronic books whose duplication is restricted have been under development from the viewpoint of protecting the copyrights of and preventing undue duplication (multiple duplications) of electronic books. An example of the services is disclosed in Non-patent Literature 1.

Non-patent Literature 1 discloses a service that sells electronic textbooks, i.e. a category of electronic book. Specifically, the service permits a user (e.g. a teacher) to create his/her own unique material by installing, onto a PC, content such as characters, still images, and moving images contained in an electronic textbook whose duplication is restricted from the viewpoint of copyright protection etc. and by being enabled to edit the content of the electronic textbook. That is, the service strives for copyright protection etc. by restricting, to use in a single PC onto which the content has been installed in advance, (a) content of an electronic textbook whose duplication is restricted and (b) a user's own unique material created by utilizing the content.

CITATION LIST

Non-patent Literature 1
"Mai Kyôkasho Edita" (My Textbook Editor), [online], TOKYO SHUPPAN Co., Ltd., [searched for on Mar. 9, 2012], Internet <http://ten.tokyo-shoseki.co.jp/text/shou/digital/index.html>

SUMMARY OF INVENTION

Technical Problem

However, the service of Non-patent Literature 1 has made it necessary for a user who would like to use such content of an electronic textbook and his/her own unique material in a plurality of places to carry with him/her a PC in which these items of data have been stored. This has posed a risk of hampering the convenience of these items of data. Further, the service has not made it possible to use the user's own unique material on a plurality of PCs.

The present invention has been made in order to solve the foregoing problems, and it is an object of the present invention to provide an information recording device, an information recording medium, and an information recording method that make it possible to improve the user convenience of data whose duplication is restricted and data created by utilizing the data.

Solution to Problem

In order to solve the foregoing problems, an information recording device according to the present invention is an information recording device capable of recoding information onto an information-recordable region of an information recording medium, including: recording means for recording, onto the information-recordable region, secondary information created by utilizing primary information whose duplication onto a different information recording medium is restricted.

Furthermore, an information recording method according to the present invention is an information recording method for recoding information onto an information-recordable region of an information recording medium, including a recording step of recording, onto the information-recordable region, secondary information created by utilizing primary information whose duplication onto a different information recording medium is restricted.

Using the information recording device including the recording means or the information recording method including the recording step to recording the secondary information on the information-recordable region of the information recording medium and loading the information recording medium onto an information replay device enable replaying of the secondary information by the information replay device. This makes it possible to share the secondary information between different devices, thus making it possible to improve user convenience.

Furthermore, the information recording device according to the present invention is preferably configured such that the recording means is capable of obtaining the primary information from a read-only information recording region included in the same information recording medium as the information recording medium on the information-recordable region of which the secondary information is recorded.

According to the foregoing configuration, since the secondary information is recordable onto the same information recording medium as the information recording medium on which the primary information is recorded, loading the information recording medium onto an information recording and replaying device enables the information recording and replay device to replay the secondary information and to obtain the primary information and edit the secondary information.

This makes it possible to share both the primary information and the secondary information between different devices, thus making it possible to further improve user convenience.

Furthermore, the information recording device according to the present invention is preferably configured such that the recording means is capable of obtaining the primary information from a network.

According to the foregoing configuration, since various types of primary information can be obtained through the network, various types of secondary information can be created. This makes it possible to create secondary information that precisely meets the user's demand, thus making it possible to further improve user convenience.

Furthermore, the information recording device according to the present invention is preferably configured such that the primary information contains duplication restriction determination information indicating that duplication of the primary information onto a different information recording medium is restricted, the information recording device further including recording allow/disallow determination means for determining whether to allow or disallow recording of the secondary information onto the information-recordable region by determining the presence or absence of the duplication restriction determination information.

The foregoing configuration makes it possible to surely make a recording allow/disallow determination as to recording of the secondary information onto the information-recordable region, and to prevent undue duplication of the secondary information. This makes it possible to surely protect the copyright of the primary information used in the creation of the secondary information.

Furthermore, the information recording device according to the present invention is preferably configured to further include replay means for replaying the secondary information recorded on the information-recordable region, wherein: the primary information contains primary identification information for identifying the primary information; the secondary information contains secondary identification information for identifying the primary information utilized in the creation of the secondary information; and the replay means determines whether to allow or disallow replaying of the secondary information by collating the primary identification information contained in the primary information recorded on the information recording medium and the secondary identification information contained in the secondary information recorded on the information recording medium against each other.

According to the foregoing configuration, the replay means determines whether to allow or disallow replaying of the secondary information by collating the primary identification information and the secondary identification information against each other. That is, the replay means allows replaying of the secondary information in a case where it has succeeded in the collation of the primary identification information and the secondary identification information and disallows replaying of the secondary information in a case where it has failed in the collation.

Therefore, in the case of an unauthorized duplication of the secondary information, the collation of the primary identification information contained in the primary information recorded on the information recording medium and the secondary identification information contained in the secondary information recorded on the information recording medium fails; therefore, the secondary information will not be replayed.

This makes it possible to prevent an unauthorized replay of the secondary information, and to reinforce the protection of the copyright of the primary information utilized in the creation of the secondary information.

Furthermore, the information recording device according to the present invention is preferably configured to further include display processing means for, in a case where a region other than the information-recordable region has been designated by a user as a recording destination onto which the secondary information is to be recorded, performing a process of causing display means to perform a display to the effect that recording of the secondary information onto the region is prohibited.

The foregoing configuration allows the user to see through the display on the display means that the secondary information can only be recorded onto the information-recordable region, thus making it possible to further improve user convenience.

Furthermore, the information recording device according to the present invention is preferably configured to further include display processing means for performing a process of causing the display means to perform a display to the effect that duplication of the primary information onto a different information recording medium is restricted.

The foregoing configuration allows the user to see through the display on the display means that the primary information cannot be recorded onto a different information recording medium, thus making it possible to further improve user convenience.

Furthermore, the information recording device according to the present invention is preferably configured such that the secondary information contains at least part of the primary information.

According to the foregoing configuration, since replaying of the secondary information enables the primary information to be replayed, too, it is not necessary to replay the primary information separately from the secondary information. This shortens the amount of time required to read out the primary information and the secondary information, thus making it possible to improve response to an instruction to read out these items of information.

Furthermore, the information recording device according to the present invention is preferably configured such that the secondary information contains access information for accessing at least part of the primary information.

According to the foregoing configuration, it is possible, even without the secondary information containing the primary information, to read out the primary information when the secondary information is replayed. This makes it possible to save the storage capacity of the information-recordable region.

Furthermore, the information recording device according to the present invention is preferably configured to further include display processing means for performing a process of causing the display means to display, in a display region of the primary information contained in the secondary information, a primary information identifier indicating that information displayed in the display region is at least part of the primary information.

According to the foregoing configuration, by confirming the display of the primary information identifier at the time of display of the secondary information, the user can easily grasp that the primary information is contained in the secondary information and that the information being displayed is information that is recordable onto a region other than the information-recordable region of the information recording medium.

Furthermore, in order to solve the foregoing problems, an information recording medium according to the present invention is an information recording medium including an information-recordable region onto which information is recordable, secondary information created by utilizing primary information whose duplication onto a different information recording medium is restricted being recorded on the information-recordable region.

According to the foregoing configuration, since the secondary information is recorded on the information-recordable region of the information recording medium, loading the information recording medium onto the information replay device enables replaying of the secondary information by the information replay device. This makes it possible to share the secondary information between different devices, thus making it possible to improve user convenience.

Furthermore, the information recording medium according to the present invention is preferably configured to further include a read-only information recording region on which the primary information is recorded.

According to the foregoing configuration, since the information recording medium includes a read-only information recording region on which the primary information is recorded, the primary information and the secondary information can be managed on the same information recording medium. Therefore, loading the information recording medium of the present invention onto an information recording and replaying device enables the information recording and replaying device to replay the secondary information and to obtain the primary information and edit the secondary information.

This makes it possible to share both the primary information and the secondary information between different devices, thus making it possible to further improve user convenience.

Advantageous Effects of Invention

As described above, the information recording device according to the present invention is configured to include recording means for recording, onto the information-recordable region, secondary information created by utilizing primary information whose duplication onto a different information recording medium is restricted.

Further, as described above, the information recording medium according to the present invention is configured such that secondary information created by utilizing primary information whose duplication onto a different information recording medium is restricted is recorded on the information-recordable region.

Further, as described above, the information recording method according to the present invention is a method including a recording step of recording, onto the information-recordable region, secondary information created by utilizing primary information whose duplication onto a different information recording medium is restricted.

This makes it possible to share the secondary information between different devices, thus making it possible to improve user convenience.

DESCRIPTION OF EMBODIMENTS

Figure 1:
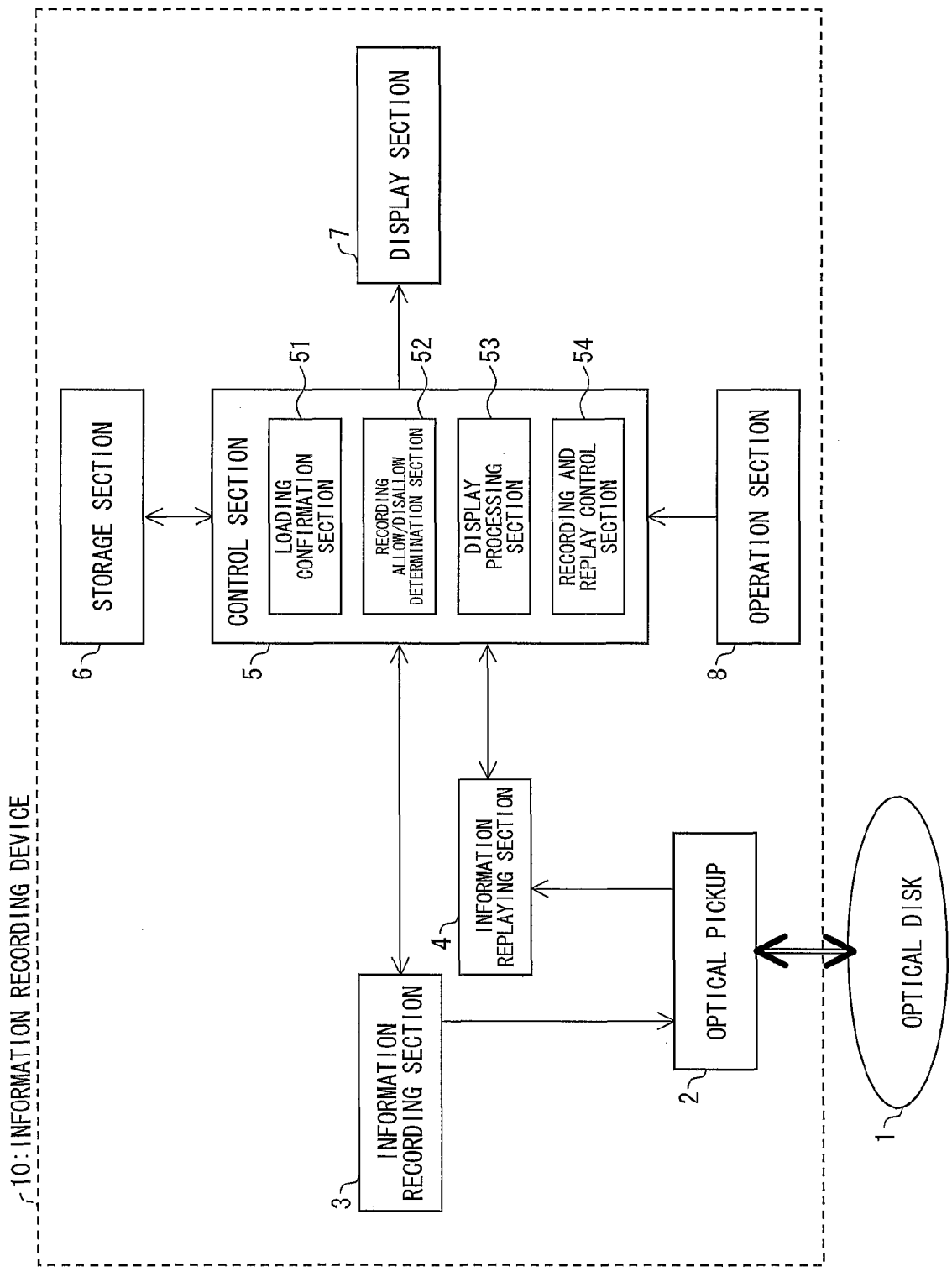
FIG. 1 is a block diagram schematically showing an example of a configuration of an information recording device according to an embodiment of the present invention.

An embodiment of the present invention is described below with reference to the drawings. For convenience of explanation, members having the same functions as those of members shown in the drawings are given the same reference signs, and as such, are not described below.

An information recording device 10 according to the present embodiment and a method (information recording method) for controlling the same, as well as an optical disk 1 (information recording medium), are intended to improve the user convenience of a selling service that, from the viewpoint of protecting the copyright of and preventing undue duplication of data (content) whose duplication is restricted, restricts the duplication of the data and then permits a user to edit the data.

First, main items of information that are to be processed by the information recording device 10, namely duplication-restricted information 31 (primary information) and duplication-restricted information utilization information 32 (secondary information), are described.

[Duplication-Restricted Information 31 and Duplication-Restricted Information Utilization Information 32]

Examples of main items of information that are to be processed by the information recording device 10 include duplication-restricted information 31 (primary information) and duplication-restricted information utilization information (secondary information). The duplication-restricted information 31 is information that is recordable onto (or information that is recorded on) an optical disk 1, and the duplication-restricted information utilization information 32 is information that is recordable onto the optical disk 1.

<Duplication-Restricted Information 31>

The duplication-restricted information 31 is information that is restricted from duplication onto a different optical disk for the purpose of protecting the copyright of and preventing undue duplication of the duplication-restricted information 31. A common DRAM (digital rights management) technology is used in the restriction of duplication of the duplication-restricted information 31. Further, the duplication-restricted information 31 may be in encrypted form.

Examples of the duplication-restricted information 31 include: content such as sentences, still images, and moving images contained in an electronic textbook; and general content such as still images, moving images, games, software, and programs.

Further, the duplication-restricted information 31 may contain duplication restriction determination information indicating that duplication of the duplication-restricted information 31 onto a different optical disk is restricted.

<Duplication-Restricted Information Utilization Information 32>

The duplication-restricted information utilization information 32 is information that is created by utilizing the duplication-restricted information 31 and that is created by the user via an operation section 8 of the information recording device 10. The duplication-restricted information utilization information 32 is information that is to be recorded onto an RE layer 22 (information-recordable region) (see FIG. 2) of the optical disk 1.

Figure 5:
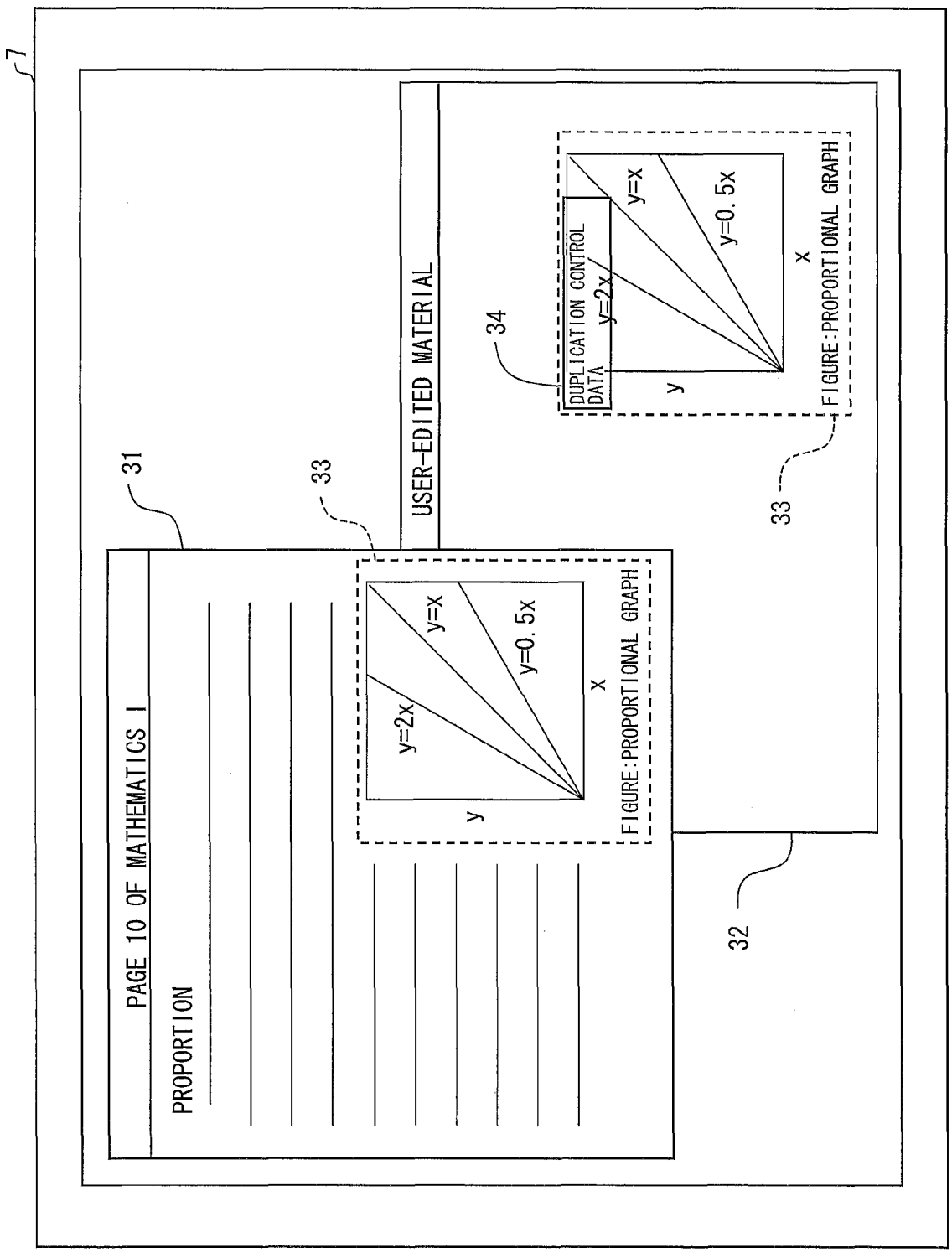
FIG. 5 is a diagram showing an example of an edit screen that is displayed on a display section of an information recording device according to an embodiment of the present invention.
Figure 6:
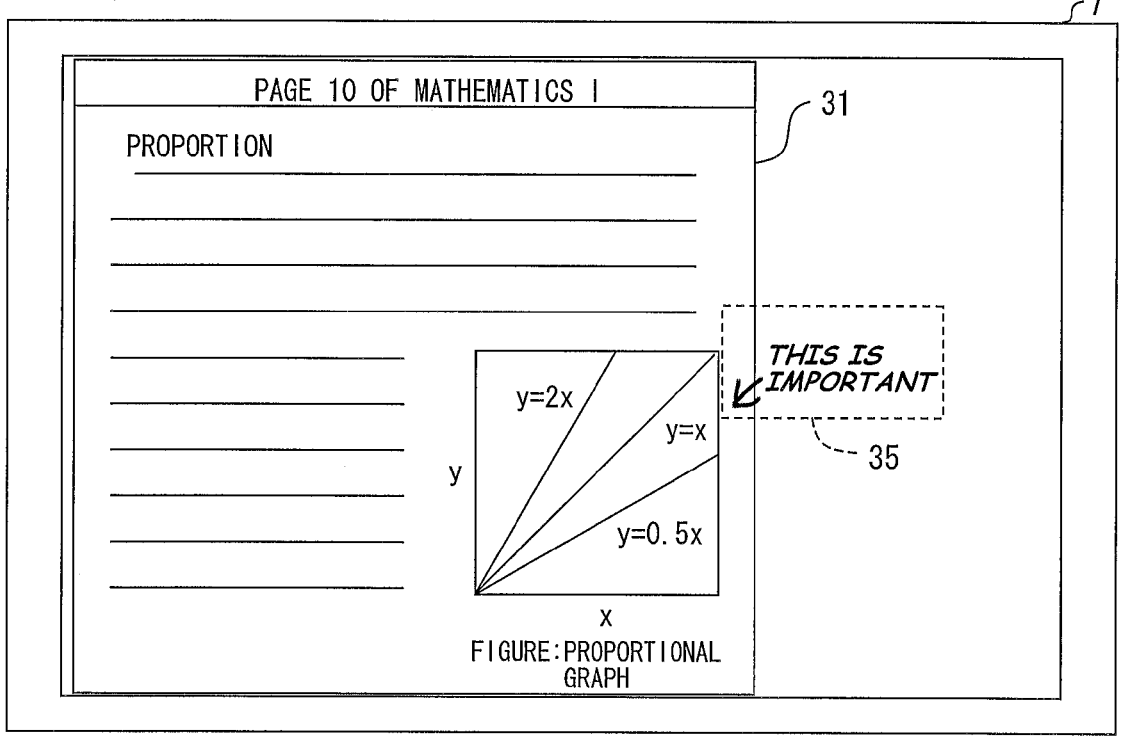
FIG. 6 is a diagram showing another example of an edit screen that is displayed on a display section of an information recording device according to an embodiment of the present invention.
Figure 6:
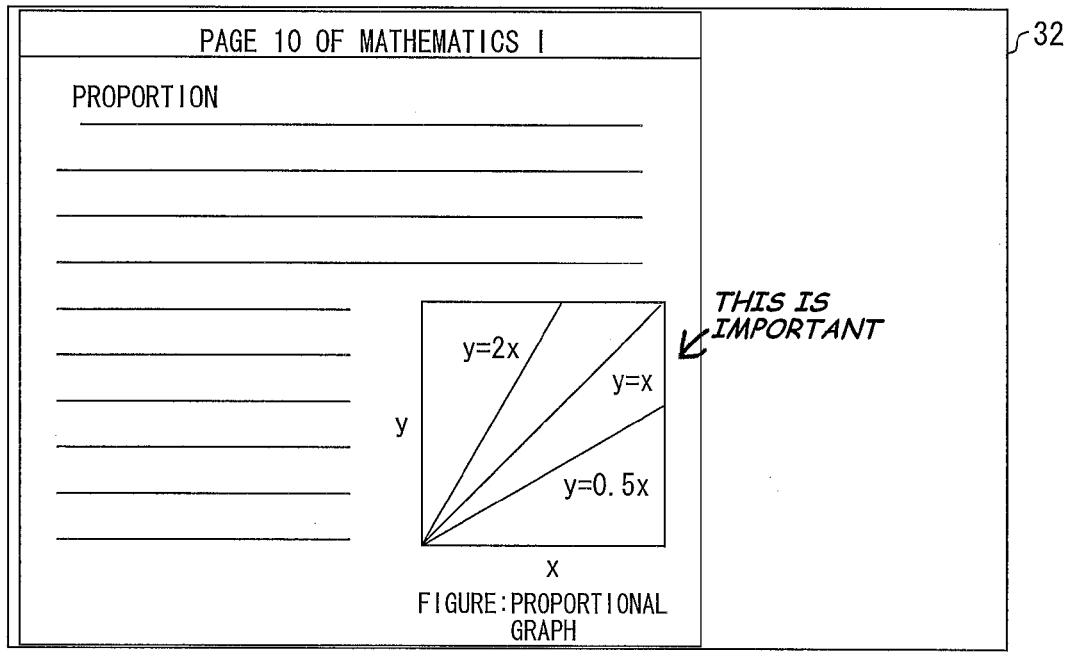

For example in a case where the duplication-restricted information 31 is an electronic textbook, the duplication-restricted information utilization information 32 is (a) an electronic textbook or material uniquely edited by the user (teacher) which is created by utilizing sentences, still images, moving images, etc. contained in the electronic textbook (see FIG. 5) or (b) an electronic textbook containing a blackboard demonstration that has written during class and sounds, pictures, etc. that have been recorded during class (see FIG. 6). Further, in a case where the duplication-restricted information 31 is general content such as still images, moving images, games, software, and programs, the duplication-restricted information utilization information 32 is content uniquely edited by the user utilizing these items of content.

Further, the duplication-restricted information utilization information 32 may contain information other than the duplication-restricted information 31 that have been separately prepared by the user, such as photographs and pictures that have been taken by the user.

In addition, the duplication-restricted information utilization information 32 may contain at least part of the duplication-restricted information 31, such as the duplication-restricted information 31 per se or sentences and/or still images contained in the duplication-restricted information 31.

In this case, since replaying of the duplication-restricted information utilization information 32 by the information recording device 10 (or another information recording and replaying device) enables the duplication-restricted information 31 to be replayed (at the same time), too, it is not necessary to replay the duplication-restricted information 31 separately from the duplication-restricted information utilization information 32. This shortens the amount of time required to read out the duplication-restricted information 31 and the duplication-restricted information utilization information 32, thus making it possible to improve response to an instruction to read out these items of information.

Further, even in a case where the duplication-restricted information 31 is contained in the duplication-restricted information utilization information 32, the duplication-restricted information utilization information 32 is recorded on the RE layer 22 of the optical disk 1. Therefore, especially in a case where the duplication-restricted information 31 is recorded on a ROM layer 21 (read-only information recording region) (see FIG. 2) of the optical disk 1, undue duplication of the duplication-restricted information 31 can be prevented.

Further, instead of containing at least part of the duplication-restricted information 31, the duplication-restricted information utilization information 32 may contain access information for accessing at least part of the duplication-restricted information 31.

In this case, it is possible, even without the duplication-restricted information utilization information 32 containing the duplication-restricted information 31 per se, to read out the duplication-restricted information 31 when the duplication-restricted information utilization information 32 is replayed by the information recording device 10 or another information recording and replaying device. This makes it possible to save the storage capacity of the RE layer 22 of the optical disk 1.

Further, especially in a case where the duplication-restricted information 31 is recorded on the ROM layer 21 of the optical disk 1, the information recording and replaying device on which the optical disk 1 has been loaded (a recording and replay control section 54 in the case of the information recording device 10) ends up replaying the created duplication-restricted information utilization information 32 with reference to the duplication-restricted information 31. Therefore, by the duplication-restricted information utilization information 32 containing the access information, the possibility of becoming unable to access (becoming delinked from) the duplication-restricted information 31 during replaying of the duplication-restricted information utilization information 32 is eliminated. This makes it possible to improve user convenience.

In the following, the information recording device 10, which is intended to process the duplication-restricted information 31 and the duplication-restricted information utilization information 32, and the optical disk 1, onto which these items of information are recordable or on which these items of information are recorded, are described in concrete terms.

[Configuration of the Information Recording Device 10]

First, a configuration of the information recording device 10 is described with reference to FIG. 1. FIG. 1 is a block diagram schematically showing a configuration of the information recording device 10 according to an embodiment of the present invention.

The information recording device 10 of the present embodiment is configured to be able to record and/or replay various types of information (data) with respect to the RE layer 22 of the optical disk 1. Specifically, as shown in FIG. 1, the information recording device 10 includes an optical pickup 2, an information recording section 3, an information replaying section 4, a control section 5, a storage section 6, a display section 7 (display means), and an operation section 8.

It should be noted that the information recording device 10 does not necessarily need to include a function (such as the information replaying section 4 and a replay control section 55) that enables replaying of information of the optical disk 1, but needs only include a function (such as the information recording section 3 and the recording and replay control section 54) that enables recording of information onto the optical disk 1.

The optical pickup 2 passes a laser beam over the optical disk 1 to read out information (data row) recorded on the optical disk 1 or to record information onto the optical disk 1.

The information recording section 3 is a drive circuit that controls the position of the optical pickup 2 with respect to the optical disk 1, the intensity of a laser beam that is outputted from the optical pickup 2, and the like to record information onto the optical disk 1 via the optical pickup 2.

The information replaying section 4 is a drive circuit that controls the optical pickup 2 in the same manner as the information recording section 3 to replay, via the optical pickup 2, information recorded on the optical disk 1.

The control section 5 controls each of the components of the information recording device 10. Specifically, by reading out various programs stored in the storage section 6 onto a temporary storage section (not illustrated) constituted, for example, by RAM (random access memory), the control section 5 performs various types of processing such as the control of recording or replaying of information, the control of display processing on the display section 7, the creation of the duplication-restricted information utilization information 32 utilizing the duplication-restricted information 31.

Examples of the various programs include a duplication control program for monitoring a recording destination onto which the duplication-restricted information utilization information 32 is to be recorded, a duplication-restricted information utilization program for creating the duplication-restricted information utilization information 32, a replay program for replaying the duplication-restricted information 31 and the duplication-restricted information utilization information 32 recorded on the optical disk 1, etc. Further, on the assumption of a case where the duplication-restricted information 31 is in encrypted form, a decryption program for decrypting the encrypted duplication-restricted information 31 may be included.

In the present embodiment, these programs are stored in advance in the storage section 6. However, this does not imply any limitation. These programs may be recorded on the ROM layer 21 of the optical disk 1.

Further, in order to achieve control of each of the components, the control section 5 mainly includes a loading confirmation section 51, a recording allow/disallow determination section 52 (recording allow/disallow determination means), a display processing section 53 (display processing means), and a recording and replay control section 54 (recording means).

The loading confirmation section 51 detects and confirms loading and ejection of the optical disk 1 onto and from the information recording device 10.

The recording allow/disallow determination section 52 determines whether or not the duplication-restricted information 31 contains the aforementioned duplication restriction determination information (the presence or absence of duplication restriction determination information), and thereby determines whether to allow or disallow recording of the duplication-restricted information utilization information 32 onto the RE layer 22 of the optical disk 1.

This configuration makes it possible to surely make the aforementioned recording allow/disallow determination, and to prevent undue duplication of the duplication-restricted information utilization information 32. Further, since the duplication-restricted information utilization information 32 is information that is created by utilizing the duplication-restricted information 31, the abuse of the copyright of the duplication-restricted information 31, which is an issue of concern due to undue duplication, can be prevented.

The display processing section 53 performs a process of causing the display section 7 to display various types of information.

Figure 4:
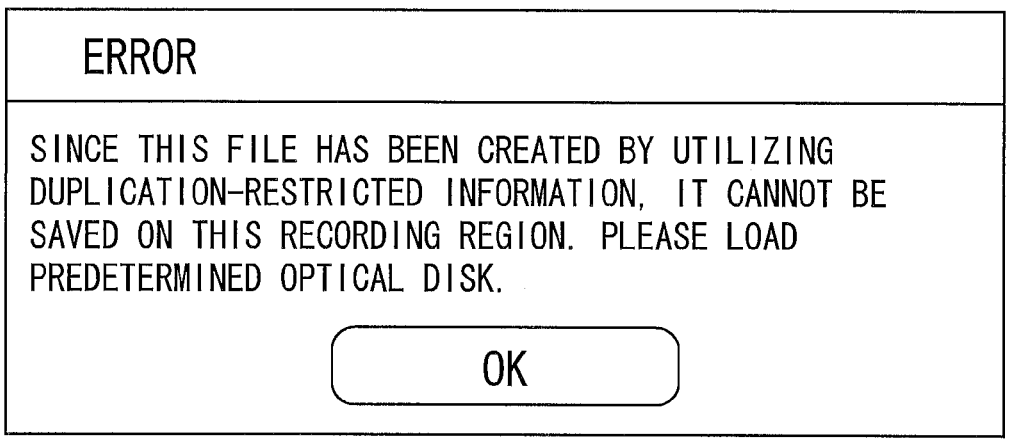
FIG. 4 is a diagram showing an example of an error display screen that is displayed on a display section of an information recording device according to an embodiment of the present invention.
Figure 4:
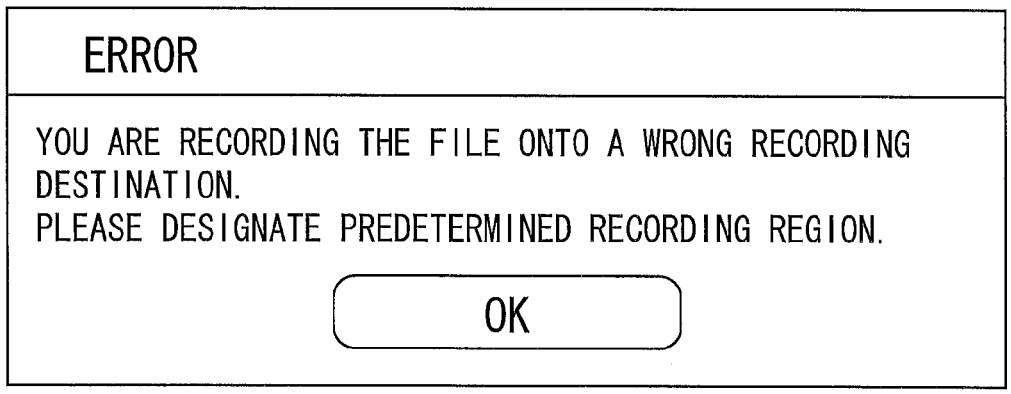

Especially, in the present embodiment, in a case where the user has designated a region other than the RE layer 22 of the optical disk 1 as a recording destination onto which the duplication-restricted information utilization information 32 is to be recorded, the display processing section 53 causes the display section 7 to display an error display screen (see (b) of FIG. 4) to the effect that recording of the duplication-restricted information utilization information 32 onto the region is prohibited. This allows the user to see that the duplication-restricted information utilization information 32 can only be recorded onto the RE layer 22 of the optical disk 1.

In addition, the display processing section 53 may cause the display section 7 to display an error display screen (see (a) of FIG. 4) to the effect that duplication of the duplication-restricted information 31 onto a different optical disk is restricted. This allows the user to see that the duplication-restricted information 31 cannot be recorded on an optical disk that is different from the loaded optical disk 1.

That is, the display processing section 53 can call attention to the user by causing an error display screen to be displayed in such a case as those mentioned above.

Further, the display processing section 53 causes the display section 7 to display, in a display region of the duplication-restricted information 31 contained in the duplication-restricted information utilization information 32, a primary information identifier 34 (see FIG. 5) indicating that the information displayed in the display region is at least part of the duplication-restricted information utilization information 32.

This allows the user to easily grasp, depending on the presence or absence of a display of the primary information identifier 34, whether or not the duplication-restricted information 31 is contained in the duplication-restricted information utilization information 32 and whether or not the information displayed in the display section 7 is information that is recordable onto a region other than the RE layer 22 of the optical disk 1.

That is, by confirming the display of the primary information identifier 34, the user can easily grasp that the duplication-restricted information 31 is contained in the duplication-restricted information utilization information 32. Further, through the confirmation, the user can easily grasp that the information in the predetermined display region containing the primary information identification section 34 is the duplication-restricted information utilization information 32.

The recording and replay control section 54 controls the information recording section 3 and thereby controls recording of information onto the optical disk 1.

Especially, in the present embodiment, the recording and replay control section 54 uses the information recording section 3 and the optical pickup 2 to record, onto the RE layer 22 of the optical disk 1, the duplication-restricted information utilization information 32 created by utilizing the duplication-restricted information 31.

This allows the information recording device 10 to record the duplication-restricted information utilization information 32 onto the RE layer 22 of the optical disk 1. This makes it possible to share the duplication-restricted information utilization information 32 between different devices, thus making it possible to improve user convenience.

Further, in a case where the duplication-restricted information 31 is recorded on the ROM layer 21 of the optical disk 1, the recording and replay control section 54 can obtain the duplication-restricted information 31 from the ROM layer 21. That is, the recording and replay control section 54 can obtain the duplication-restricted information 31 from the ROM layer 21 included in the same optical disk 1 as the optical disk 1 on the RE layer 22 of which the duplication-restricted information utilization information 32 is recorded.

In this case, since the duplication-restricted information utilization information 32 is recordable onto the optical disk 1 on which the duplication-restricted information 31 is recorded, loading the optical disk 1 onto the information recording device 10 or another information recording and replaying device enables the device to replay the duplication-restricted information utilization information 32 and to obtain the duplication-restricted information 31 and edit the duplication-restricted information utilization information 32. This makes it possible to share both the duplication-restricted information 31 and the duplication-restricted information utilization information 32 between different devices.

Further, the recording and replay control section 54 may also obtained the duplication-restricted information 31 from a network. This makes it possible to obtain the duplication-restricted information 31 and create the duplication-restricted information utilization information 32 even in a case where the duplication-restricted information 31 is not recorded on the optical disk 1. Further, since various types of duplication-restricted information 31 can be obtained through the network, various types of duplication-restricted information utilization information 32 can be created. This makes it possible to create duplication-restricted information utilization information 32 that precisely meets the user's demand.

Further, the recording and replay control section 54 also controls the information replaying section 4 and thereby controls reading out of information recorded on the optical disk 1. Especially, in the present embodiment, the recording and replay control section 54 executes a replay program stored in the storage section 6 to read out the duplication-restricted information 31 and/or the duplication-restricted information utilization information 32 onto the optical disk 1.

It should be noted that in a case where the duplication-restricted information 31 contains duplication-restricted information identification information (primary identification information) for identifying the duplication-restricted information 31 and the duplication-restricted information utilization information 32 contains utilized duplication-restricted information identification information (secondary identification information) for identifying the duplication-restricted information 31 utilized in the creation of the duplication-restricted information utilization information 32, the recording and replay control section 54 can also perform the following process.

That is, the recording and replay control section 54 may determine whether to allow or disallow replaying of the duplication-restricted information utilization information 32 by collating the duplication-restricted information identification information contained in the duplication-restricted information 31 recorded on the optical disk 1 and the utilized duplication-restricted information identification information contained in the duplication-restricted information utilization information 32 recorded on the optical disk 1 against each other. In this case, the recording and replay control section 54 allows replaying of the duplication-restricted information utilization information 32 in a case where it has succeeded in the collation of the duplication-restricted information identification information and the utilized duplication-restricted information identification information and disallows replaying of the duplication-restricted information utilization information 32 in a case where it has failed in the collation.

Further, for example when the duplication-restricted information utilization information 32 is created by utilizing the duplication-restricted information 31, the recording and replay control section 54 assigns the duplication-restricted information utilization information 32 the utilized duplication-restricted information identification information set to form a pair with the duplication-restricted information identification information contained in the duplication-restricted information 31. The duplication-restricted information identification information and the utilized duplication-restricted information identification information may form a pair with each other and be collatable against each other by a predetermined method. For example, the utilized duplication-restricted information identification information may be calculated from the duplication-restricted information identification information by a predetermined mathematical formula. Further, the duplication-restricted information identification information and the utilized duplication-restricted information identification information may be identical to each other.

According to this configuration, in the case of an unauthorized duplication of the duplication-restricted information utilization information 32, the collation of the duplication-restricted information identification information contained in the duplication-restricted information 31 recorded on the optical disk 1 and the utilized duplication-restricted information identification information contained in the duplication-restricted information utilization information 32 recorded on the optical disk 1 fails; therefore, the secondary information will not be replayed. This makes it possible to prevent an unauthorized replay of the duplication-restricted information utilization information 32, and to reinforce the protection of the copyright of the duplication-restricted information 31 utilized in the creation of the duplication-restricted information utilization information 32.

The storage section 6 has a function of storing various types of information. For example, part of the storage section 6 functions as the temporary storage section in which the duplication-restricted information 31, the duplication-restricted information utilization information 32, etc., as well as various programs read out by the control section 5, are temporarily stored. Further, another part of the storage section 6 is constituted by a nonvolatile storage device, such as a ROM (read-only memory) flash memory, in which the various programs are stored.

The display section 7 is a display that displays various types of information. The display section 7 is realized by, but is not limited to, an LCD (liquid crystal display), a PDP (plasma display panel), or the like.

The operation section 8 accepts the user's input operation, and is realized by an operation button, a mouse, a touch panel, and/or the like. Especially, the operation section 8 is used for the user to create the duplication-restricted information utilization information 32.

It should be noted that the display section 7 and the operation section 8 do not need to be configured to be included in the information recording device 10, but may be configured as separate devices from the information recording device 10 to form a single communication system.

[Configuration of an Optical Disk 1]

Figure 2:
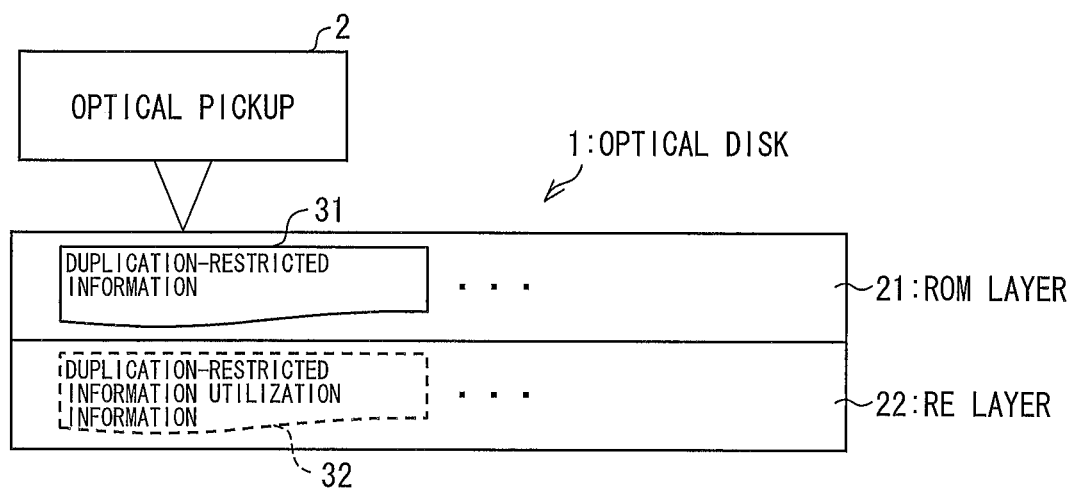
FIG. 2 is a block diagram schematically showing an example of a configuration of an optical disk according to an embodiment of the present invention.

Next, a configuration of an optical disk 1 is described with reference to FIG. 2. FIG. 2 is a block diagram schematically showing an example of an optical disk 1 according to an embodiment of the present invention.

The optical disk 1 is a removable medium, such as BD (Blu-Ray Disc, Registered Trademark) or DVD (digital versatile disc), onto which various types of information is recordable. As shown in FIG. 2, the optical disk 1 is formed from a ROM (read-only memory) layer 21 on which read-only information is recorded in advance and an RE (rewritable) layer 22 onto which information is rewritable (recordable).

Further, in FIG. 2, for example, duplication-restricted information 31 such as an electronic book recorded in advance by a provider (content provider) of duplication-restricted information 31 is recorded on the ROM layer 21. Meanwhile, duplication-restricted information utilization information 32 such as an edited electronic textbook or material uniquely created by the user utilizing the electronic textbook recorded on the ROM layer 21 is recorded on the RE layer 22 by the recording and replay control section 54 of the information recording device 10.

Since the optical disk 1 includes the ROM layer 21 and the RE layer 22, the duplication-restricted information 31 and the duplication-restricted information utilization information 32 can be managed on the same optical disk 1.

Although the present embodiment has been described by taking, as an example, an optical disk 1 including a ROM layer 21 and an RE layer 22, it is not dispensable to include a ROM layer 21 on which duplication-restricted information 31 is recorded, and it is only necessary to include an RE layer 22.

That is, if the duplication-restricted information utilization information 32 created by utilizing the duplication-restricted information 31 is recorded on the RE layer 22 of the optical disk 1, it become possible to replay the duplication-restricted information utilization information 32 on the information recording device 10 on which the optical disk 1 has been loaded or another information recording device on which the optical disk 1 has been loaded. This makes it possible to share the duplication-restricted information utilization information 32 between different devices, thus making it possible to improve user convenience.

Further, the optical disk 1 does not needs to be realized by a laminated structure of the ROM layer 21 and the RE layer 22 as described above, but, instead of these layers, may include a read-only information recording region onto which to record read-only information and an information-recordable region onto which information is recordable.

It should be noted as long as information is recordable, the RE layer 22 may be replaced by an R (recordable) layer, i.e. a write once, read many recording layer. The optical disk 1 may be replaced by an information recording medium such as a magnetic disk, a flash memory, or a USB (universal serial bus) memory.

[Flow of a Process in the Information Recording Device 10]

Figure 3:
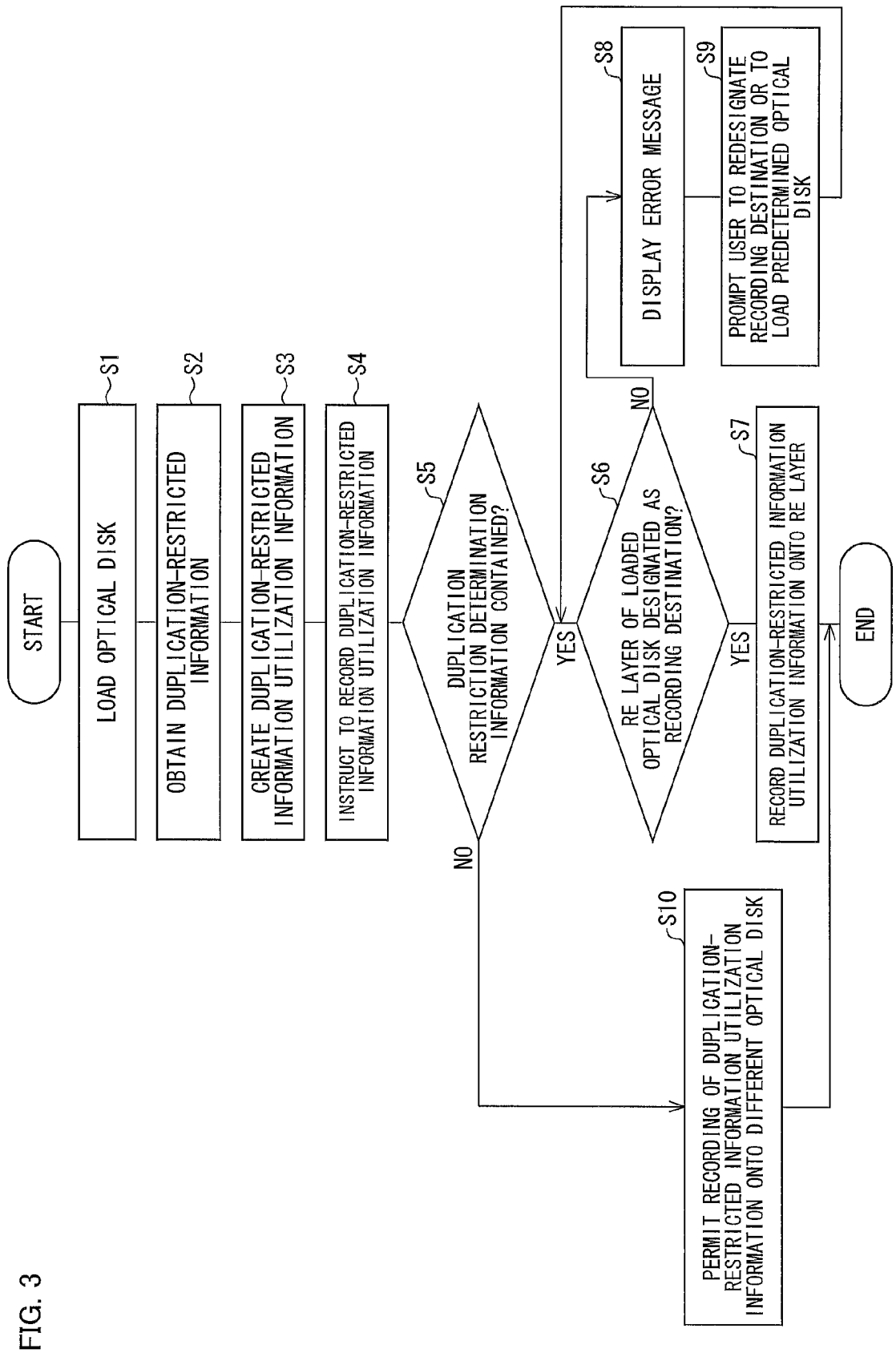
FIG. 3 is a flow chart showing an example of a process in an information recording device according to an embodiment of the present invention.

Next, the flow of a process in the information processing device 10 is described with reference to FIG. 3. FIG. 3 is a flow chart showing an example of the flow of a process in the information processing device 10. Further, FIG. 4 is a diagram showing an example of an error display screen that is displayed on the display section 7 in step S9 of FIG. 3.

This process is described on the premise that an optical disk 1 on the ROM layer 21 of which duplication-restricted information 31 is recorded in advance but on the RE layer 22 of which at least duplication-restricted information utilization information 32 is not recorded is loaded onto the information recording device 10.

First, when the optical disk 1 has been loaded on the information recording device 10, the loading confirmation section 51 confirms the loading (S1) and sends a loading confirmation signal to the recording and replay control section 54.

Upon receiving the loading confirmation signal, the recording and replay control section 54 reads out duplication-restricted information utilization program from the storage section 6 and executes it, and also reads out and obtains the duplication-restricted information 31 from the ROM layer 21 of the optical disk 1 (S2). Then, the duplication-restricted information 31 thus obtained is displayed on the display section 7 by the display processing section 53. According to this, the user creates duplication-restricted information utilization information 32 by utilizing the duplication-restricted information 31 (S3). That is, the duplication-restricted information utilization information 32 is created while the duplication-restricted information 31 recorded on the ROM layer 21 is being replayed.

It should be noted that in step S2, predetermined duplication-restricted information 31 may be obtained through a network in a case where there is no duplication-restricted information 31 recorded on the optical disk 1.

When the creation of duplication-restricted information utilization information 32 has been completed and when the recording and replay control section 54 has obtained a user operation indicating an instruction to record the duplication-restricted information utilization information 32 (S4), the recording and replay control section 54 terminates the duplication-restricted information utilization program and activates the duplication control program to start monitoring whether the duplication-restricted information utilization information 32 recorded onto a predetermined recording destination. According to this, steps S6 to S9 are executed. As the recording destination, the RE layer 22 of the loaded optical disk 1 is designated in advance.

Upon obtaining the user operation, the recording allow/disallow determination section 52 confirms the presence or absence of duplication restriction determination information contained in the duplication-restricted information 31 thus obtained (S5).

If the recording allow/disallow determination section 52 has confirmed that duplication restriction determination information is contained (YES in S5), the recording allow/disallow determination section 52 sends, to the recording and replay control section 54, a confirmation signal indicating that duplication restriction determination information is contained. Upon receiving this confirmation signal, the recording and replay control section 54 confirms whether or not the recording destination designated by the user in the process of step S4 is the RE layer 22 of the loaded optical disk 1 (S6). At this point in time, the recording and replay control section 54 confirms through the loading confirmation section 51 whether the optical disk 1 loaded in the process of step S6 is the one that was loaded in step 1.

If the recording and replay control section 54 has confirmed that the optical disk 1 loaded in the process of step S6 is the one that was loaded in step 1 and that the recording destination designated by the user in the process of step S4 is the RE layer 22 of the loaded optical disk 1 (YES in S6), the recording and replay control section 54 records, on the RE layer 22 of the optical disk 1, the duplication-restricted information utilization information 32 created in step 3 (S7: recording step).

On the other hand, if, in the process of step S6, the recording and replay control section 54 has confirmed through the loading confirmation section 51 that no optical disk 1 has been loaded (NO in S6), the recording and replay control section 54 sends, to the display processing section 53, a loading confirmation signal indicating that no optical disk 1 has been loaded. Upon receiving the loading confirmation signal, the display processing section 53 displays an error display screen containing an error message such as the one shown in (a) of FIG. 4 (S8), and prompts the user to load a predetermined optical disk 1 (i.e. the optical disk 1 that was loaded in step S1) (S9).

Further, in a case where the user has designated a recording destination that is different from the preset recording destination (NO in S6), the recording and replay control section sends, to the display processing section 53, a misdesignation confirmation signal indicating that the user has designated a recording destination that is different from the preset recording destination. Upon receiving the misdesignation confirmation signal, the display processing section 53 displays an error display screen containing an error message such as the one shown in (b) of FIG. 4 (S8), and prompts the user to redesignate a recording destination (S9) or displays the right recording destination.

It should be noted that if, after the start of the process of step S7, the user attempts to designate a recording destination that is different from the preset recording destination, the recording and replay control section 54 discontinues the process of step S7 and then performs a process similar to the one described above.

Thus, the process described above makes it possible to record the duplication-restricted information utilization information 32 on the RE layer 22 of the optical disk 1 on which the duplication-restricted information 31 is recorded, i.e. makes it possible to perform such duplication control that the duplication-restricted information 31 and the duplication-restricted information utilization information 32 are recorded on the same optical disk.

Alternatively, if, in step S5, the recording allow/disallow determination section 52 has confirmed that no duplication restriction determination information is contained (NO in S5), the recording allow/disallow determination section 52 instructs the recording and replay control section 54 to discontinue the execution of the duplication control program and permits recording of the duplication-restricted information utilization information 32 onto an optical disk that is different from the optical disk 1 loaded in step S1 (S10). It should be noted that the number of times the duplication-restricted information utilization information 32 is duplicated has been set in advance, so that undue duplication of the duplication-restricted information utilization information 32 can be prevented even in a case where the process of step S10 is executed.

In the foregoing, the display processing section 53 performs display control on the display section 7 in the process of S3, S8, and S9. However, this does not imply any limitation.

For example, the display section 7 may be caused to display a confirmation screen for confirming whether or not the process of S2, S4, and S5 to S7 may be executed. This makes it possible to achieve expeditious processing in a case where the confirmation screen is not displayed, and to achieve processing according to the user's intent in a case where the confirmation screen is displayed.

Further, steps S3 and S4 (from the start to completion of creation of the duplication-restricted information utilization information 32) and step S5 (confirmation of the presence or absence of duplication restriction determination information) do not need to be executed in this order. The process of step S5 may be executed before the process of step S3 or may be executed in parallel with the process of steps S3 and S4.

Further, the process of step S5 is started upon an instruction from the user in step S4. However, this does not imply any limitation. For example, the process of step S5 may be started every predetermined period of time.

[Examples of Edit Screens for Duplication-Restricted Information Utilization Information 32]

Next, examples of edit screens on which the duplication-restricted information utilization information 32 is created in step S3 of FIG. 3 by utilizing the duplication-restricted information 31 are described with reference to FIGS. 5 and 6. FIGS. 5 and 6 are each a diagram showing an example of an edit screen.

FIG. 5 shows an example of an edit screen on which duplication-restricted information utilization information 32 (user-edited material) that is created by utilizing duplication-restricted information 31 (electronic textbook) is being prepared in advance for a class in which the duplication-restricted information 31 is used. FIG. 5 shows an example where the duplication-restricted information 31 (electronic textbook) and the duplication-restricted information utilization information 32 (user-edited material) that is created by utilizing the electronic textbook are displayed on the display section 7 at the same time.

Further, in this example, the user (teacher) designates a cut frame 33 out of data ("FIGURE: PROPORTIONAL GRAPH" in "PAGE 10 OF MATHEMATICS I") contained in the duplication-restricted information 31, copies the data inside of the cut frame 33, and pastes it in his/her desired place on a display region in which the duplication-restricted information utilization information 32 is created ("FIGURE: PROPORTIONAL GRAPH" in "USER-EDITED MATERIAL").

At this point in time, the recording and replay control section 54 controls the display processing section 53 and thereby causes the primary information identifier 34 ("duplication control data") to be displayed in the cut frame 33 included in duplication-restricted information utilization information 32, in order that the user can recognize the duplication-restricted information 31 contained in the duplication-restricted information utilization information 32.

Recording, on the RE layer 22 of an optical disk 1, the duplication-restricted information utilization information 32 thus created before the class allows the user to conduct the class with use of the user's own unique material created by the user using the electronic textbook. This enhances the convenience of the electronic textbook.

Further, (a) of FIG. 6 shows an example of an edit screen as of when a blackboard demonstration 35 ("THIS IS IMPORTANT") has been written on the duplication-restricted information 31 during class. The recording and replay control section 54 causes the duplication-restricted information 31 on which the blackboard demonstration 35 has been written in (a) of FIG. 6 to be recorded on the RE layer 22 of the optical disk 1 as the duplication-restricted information utilization information 32 shown in (b) of FIG. 6 which has been created by utilizing the duplication-restricted information 31.

In this case, by recording, on the RE layer 22 of an optical disk 1, an electronic book containing the backboard demonstration written during class, information obtained during class can be made useful for the creation of duplication-restricted information utilization information 32 for the next class.

SUMMARY

An information recording device 10 of the present embodiment includes a recording and replay control section 54 for recording, on an RE layer 22 of an optical disk 1, duplication-restricted information utilization information 32 created by utilizing duplication-restricted information 31 whose duplication onto a different optical disk is restricted.

Further, an optical disk 1 of the present embodiment includes an RE layer 22 on which duplication-restricted information utilization information 32 created by utilizing the duplication-restricted information 31 is recorded.

This makes it possible to carry an optical disk 1 on which duplication-restricted information utilization information 32 is recorded, and therefore to share the duplication-restricted information utilization information 32 between different devices, thus improving user convenience.

It should be noted here that since the service of Non-patent Literature 1, for example, allows an electronic textbook whose duplication is restricted to be installed on a plurality of PCs, it has been possible to use the electronic textbook on a plurality of PCs at the same time. This has raised the possibility that a provider of an electronic textbook cannot distribute the electronic textbook with a sense of security. For restriction of installation of an electronic textbook on a plurality of PCs in this service, network user authentication is required, which has raised the possibility of higher costs.

In the present embodiment, since duplication of duplication-restricted information 31 onto a different optical disk is restricted, duplication-restricted information 31 recorded on one optical disk will not be recorded onto anther optical disk even if the duplication-restricted information 31 is installed on a plurality of PCs. This allows a provider of duplication-restricted information 31 to distribute the duplication-restricted information 31 with a sense of security in an inexpensive way while securing copyright protection by preventing undue duplication of duplication-restricted information 31.

Especially in a case where duplication-restricted information 31 is recorded on the ROM layer 21 of an optical disk 1, it becomes possible to share both the duplication-restricted information 31 and the duplication-restricted information utilization information 32 between different devices. This makes it possible to further improve user convenience.

Further, in this case, only an information recording and replaying device loaded with the optical disk 1 on which the duplication-restricted information 31 is recorded is allowed to utilize the duplication-restricted information 31. This eliminates the risk that the duplication-restricted information 31 may be used on a plurality of information recording and replaying devices. This allows a provider of duplication-restricted information 31 to distribute the duplication-restricted information 31 with a higher sense of security.

Another Expression of the Present Invention

It should be noted that the present invention can also be expressed as follows:

That is, an information recording and replaying device (information recording device) according to an embodiment of the present invention is an information recording and replaying device capable of recording and replaying of information with respect to an information recording medium having both a read-only recording region and a writable recording region, information recording and replaying device including: duplication-restricted information replaying means for replaying duplication-restricted information, recorded on the read-only recording region, whose duplication is restricted; and duplication control means for rendering duplication-restricted information utilization information recordable onto the writable recording region, the duplication-restricted information utilization information being created by utilizing all or part of the duplication-restricted information.

Further, the information recording and replaying device according to the embodiment of the present invention is preferably configured to further include replay means for replaying the secondary information, wherein: the primary information contains primary information identification information for identifying the primary information; and the secondary information contains utilized primary information identification information for identifying the primary information utilized in the creation of the secondary information, the information recording and replaying device further including replay allow/disallow determination means for, in replaying the secondary information, determining whether to allow or disallow replaying of the secondary information by collating the primary identification information contained in the primary information recorded on the information recording medium and the utilized primary information identification information of the secondary information against each other.

Further, the information recording and replaying device according to the embodiment of the present invention is preferably configured such that data to be recorded as the secondary information contains the content of the primary information.

Further, the information recording and replaying device according to the embodiment of the present invention is preferably configured such that data to be recorded as the secondary information contains a link for accessing the primary information.

Further, the information recording and replaying device according to the embodiment of the present invention is preferably configured to further include display processing means for, in displaying the secondary information on display means, displaying, in a region derived from the primary information displayed in the secondary information, a symbol indicating that the secondary information is derived from the primary information.

Further, an information recording medium according to an embodiment of the present invention is an information recording medium with respect to which an information recording and replaying device is capable of recording and replaying information and which includes a read-only recording region and a writable recording region, duplication-restricted information whose duplication is restricted being recording on the read-only recording region, the writable recording region being a region onto which to record duplication-restricted information utilization information created by the information recording and replaying device utilizing all or part of the duplication-restricted information.

[Supplementary Information]

Finally, the blocks of the information recording device 10, in particular, the control section 5 (the loading confirmation section 51, the recording allow/disallow determination section 52, the display processing section 53, and the recording and replay control section 54) may be constituted by hardware logic or may be realized by software as executed by a CPU as follows:

The information recording device 10 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the information recording device 10 a computer-readable storage medium containing control program code (executable program, intermediate code program, or source program) for the information recording device 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The information recording device 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. Note that the present invention can also be implemented in the form of a computer data signal embedded in a carrier wave which the program cord is embodied by electronic transmission.

That is, the information recording device 10 may be realized by computer. In this case, a control program for causing the information recording device 10 to be realized by computer by causing a computer to operate as each of the components is encompassed in the scope of the present invention. Further, a computer-readable recording medium containing the control program is encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can improve user convenience in a selling service that permits a user to edit data, and is therefore suitably applicable, for example, to an electronic textbook distribution service or the like.

REFERENCE SIGNS LIST

1 Optical disk (information recording medium)
7 Display section (display means)
10 Information recording device
21 ROM layer (read-only information recording region)
22 RE layer (information-recordable region)
31 Duplication-restricted information (primary information)
32 Duplication-restricted information utilization information (secondary information)
34 Primary information identifier
52 Recording allow/disallow determination section (recording allow/disallow determination means)
53 Display processing section (display processing means)
54 Recording and replay control section (recording means)

The invention claimed is:

1. An information recording device capable of recoding information onto an information-recordable region of an information recording medium, comprising:
a recording processor configured or programmed to record, onto the information-recordable region, secondary information created by utilizing primary information whose duplication onto a different information recording medium is restricted, and
a replay processor configured or programmed to replay the secondary information recorded on the information-recordable region, wherein
the primary information containing duplication restriction determination information indicating that duplication of the primary information onto a different information recording medium is restricted,
the information recording device further comprising a recording allow/disallow determination processor configured or programmed to determine whether to allow or disallow recording of the secondary information onto the information-recordable region by determining the presence or absence of the duplication restriction determination information,
the primary information includes primary identification information to identify the primary information,
the secondary information contains secondary identification information to identify the primary information utilized to create the secondary information, and
the replay processor is configured or programmed to determine whether to allow or disallow replaying of the secondary information by collating the primary identification information included in the primary information recorded on the information recording medium and the secondary identification information included in the secondary information recorded on the information recording medium.

2. The information recording device as set forth in claim 1, wherein the recording processor is capable of obtaining the primary information from a read-only information recording region included in the same information recording medium as the information recording medium on the information-recordable region of which the secondary information is recorded.

3. The information recording device as set forth in claim 1, wherein the recording processor is capable of obtaining the primary information from a network.

4. The information recording device as set forth in claim 1, further comprising a display processor configured or programmed to, in a case where a region other than the information-recordable region has been designated by a user as a recording destination onto which the secondary information is to be recorded, perform a process of causing a display to perform a display to the effect that recording of the secondary information onto the region is prohibited.

5. The information recording device as set forth in claim 1, further comprising a display processor configured or programmed to perform a process of causing a display to perform a display process such that duplication of the primary information onto a different information recording medium is restricted.

6. The information recording device as set forth in claim 1, wherein the secondary information contains at least part of the primary information.

7. The information recording device as set forth in claim 1, wherein the secondary information contains access information for accessing at least part of the primary information.

8. The information recording device as set forth in claim 1, further comprising a display processor configured or programmed to perform a process of causing a display to display, in a display region of the primary information contained in the secondary information, a primary information identifier indicating that information displayed in the display region is at least part of the primary information.

9. An non-transitory information recording medium comprising an information-recordable region onto which information is recordable,
secondary information created by utilizing primary information whose duplication onto a different information recording medium is restricted being recorded on the information-recordable region,
the primary information containing duplication restriction determination information indicating that duplication of the primary information onto a different information recording medium is restricted and primary identification information to identify the primary information; and
the secondary information contains secondary identification information to identify the primary information utilized to create the secondary information.

10. The non-transitory information recording medium as set forth in claim 9, further comprising a read-only information recording region on which the primary information is recorded.

11. An information recording method for recoding information onto an information-recordable region of an information recording medium, comprising:
a recording step of recording, onto the information-recordable region, secondary information created by utilizing primary information whose duplication onto a different information recording medium is restricted, and
a replay step of replaying the secondary information recorded on the information-recordable region, wherein
the primary information containing duplication restriction determination information indicating that duplication of the primary information onto a different information recording medium is restricted,
the information recording method further comprising a recording allow/disallow determination step of determining whether to allow or disallow recording of the secondary information onto the information-recordable region by determining the presence or absence of the duplication restriction determination information,
the primary information include primary identification information to identify the primary information, the secondary information includes secondary identification information to identify the primary information utilized to create the secondary information, and the replay step includes determining whether to allow or disallow replaying of the secondary information by collating the primary identification information included in the primary information recorded on the information recording medium and the secondary identification information included in the secondary information recorded on the information recording medium.

* * * * *